United States Patent
Shibata et al.

(10) Patent No.: US 6,905,125 B2
(45) Date of Patent: Jun. 14, 2005

(54) METAL GASKET

(75) Inventors: Hideshi Shibata, Hamamatsu (JP); Kanji Hanashima, Hamamatsu (JP)

(73) Assignee: Nichias Corporation, Tokyo (JP)

( * ) Notice: Subject to any disclaimer, the term of this patent is extended or adjusted under 35 U.S.C. 154(b) by 0 days.

(21) Appl. No.: 10/805,951

(22) Filed: Mar. 22, 2004

(65) Prior Publication Data

US 2004/0188956 A1 Sep. 30, 2004

(30) Foreign Application Priority Data

Mar. 28, 2003 (JP) ........................................ 2003-091937

(51) Int. Cl.[7] .......................... F16L 17/025; F16J 15/02
(52) U.S. Cl. .................... 277/626; 277/647; 277/644; 277/606
(58) Field of Search .................... 277/491, 530, 277/567, 626–627, 606, 608–609, 647, 644; 285/349, 363–368, 917; 403/21

(56) References Cited

U.S. PATENT DOCUMENTS

| | | | | |
|---|---|---|---|---|
| 3,207,524 A | * | 9/1965 | Trbovich | 277/647 |
| 3,275,335 A | * | 9/1966 | Johnson et al. | 277/639 |
| 3,339,948 A | * | 9/1967 | Weitzel | 285/331 |
| 3,595,588 A | * | 7/1971 | Rode | 277/650 |
| 3,713,660 A | * | 1/1973 | Luthe | 277/644 |
| 4,877,272 A | * | 10/1989 | Chevallier et al. | 285/111 |
| 5,354,072 A | * | 10/1994 | Nicholson | 277/647 |
| 6,042,121 A | * | 3/2000 | Ma et al. | 277/608 |
| 6,357,760 B1 | * | 3/2002 | Doyle | 277/604 |
| 6,409,180 B1 | * | 6/2002 | Spence et al. | 277/608 |
| 6,502,833 B1 | * | 1/2003 | Shibata et al. | 277/647 |

FOREIGN PATENT DOCUMENTS

| | | |
|---|---|---|
| JP | 06-056211 | 7/1992 |
| JP | 2003-194225 | 12/2001 |

* cited by examiner

*Primary Examiner*—Alison Pickard
*Assistant Examiner*—Vishal Patel
(74) *Attorney, Agent, or Firm*—Flynn, Thiel, Boutell & Tanis, P.C.

(57) ABSTRACT

An annular-shaped metal gasket, which can reduce a tightening force necessary to a seal and easily manage the manufacturability and the characteristics thereof, the metal gasket, in an annular-shaped metal gasket having a cross section provided with an outer circumferential opening and formed in one of a laterally U-shape, voids are formed to the innermost circumferential portions on the two confronting flat sealing surfaces of the metal gasket that are in contact with opponent surfaces, each void having a width equal to or more than 40% of the central wall thickness $t_0$ of a bight section and a height equal to or more than 5% of the height H of the gasket, wherein the cross section of the gasket is formed in a tuning-fork shape. A tightening force necessary to the seal can be reduced by forming the cross section of the metal gasket in the tuning-fork shape and providing the voids with the surfaces of the metal gasket in contact with the opponent surfaces.

2 Claims, 5 Drawing Sheets

G1

G5

G4

METAL GASKET

BACKGROUND OF THE INVENTION

1. Field of the Invention

The present invention relates to a metal gasket used to prevent leak of fluid in an ultra-high vacuum device used in a semiconductor manufacturing apparatus, a nuclear plant, and the like.

2. Description of the Related Art

Various types of metal gaskets have been used to obtain high airtightness in a semiconductor manufacturing apparatus and the like.

Among them, a metal hollow O-ring gasket is generally made by forming a metal pipe of stainless steel, inconel, and the like in a ring shape by bending processing and the like and welding both the ends of the metal pipe to each other. In the metal hollow O-ring gasket having the above structure, excellent sealing can be obtained by deforming the metal ring by applying a strong tightening pressure to it.

However, since the metal hollow O-ring gasket is made by welding the two ends of the metal pipe formed in the ring-shape by bending processing as described above, flashes produced at welding remain usually inside and outside of the pipe. Since the flashes outside of the pipe are treated to be eliminated by cutting, grinding, and the like, the thickness of the pipe more or less decreases. Therefore, compressive strength at the welded portion can be different from that at the other part when the gasket is tightened. In the case where it is mounted for use where an ultra-high vacuum is required, leakage may be produced at the welded portion where the thickness is decreased.

Further, when the gasket has a very small diameter of, for example, 10 mm, a problem arises in that it is difficult to bend and weld it as well as there is also a disadvantage that a very strong bolt is required to apply a strong tightening force.

To cope with the above problems, an approximately C-shaped metal C-ring gasket $G_6$ is used to reduce a welded portion by making the gasket by bending a metal sheet or a metal tube and to form the gasket easily even if its diameter is small as shown in FIG. 11.

Further, there are also used a metal C-ring gasket having a coil spring or the like disposed therein to increase an amount of restoration and a metal C-ring gasket $G_7$ having an approximately K-shaped cross section as shown in FIG. 12 that is made by cutting a metal tube.

Although the metal ring gaskets described above have been used particularly in a gas supply line of a semiconductor manufacturing apparatus, at present, SEMI (Semiconductor Equipment and Materials International) intends to standardize the gas supply line as an integrated gas system to achieve miniaturization.

As the characteristics of a gasket used in the integrated gas system, it is required that even if the gasket is replaced 20 times or more on the same flange, it can be used for sealing in addition to that the gasket can maintain ultra-high vacuum of $1 \times 10^{-11}$ Pa·m$^3$/secHe or less. In the integrated gas system, the gasket is interposed between various components such as a flange, a valve, a filter, and the like that constitute a gas passage and secured by bolts. However, it is required to reduce the tightening force of the gasket necessary to seal because the diameter of the bolt small and it is difficult to apply a large force to the bolt.

In contrast, Japanese Patent Application Publication No. 6-56211 reduces a tightening force necessary to seal by using a metal C-ring gasket $G_8$ with a spring and projections, in which a metal spring 3 is contained in metal covers 1 and 2 and circumferential projections 4 are formed on supporting surfaces acting as the sealing surfaces of the metal covers as shown in FIG. 13, and Japanese Patent Application No. 2001-401880 filed by the applicant reduces a tightening force necessary to sealing by using a metal gasket $G_5$ having annular projections $a_1$ formed on the surfaces thereof as shown in FIG. 6.

However, since these metal C-ring gaskets with the projections secure a sealing property by generating concentrated loads through the small projections when the gaskets are used, they are disadvantageous in the following points. That is, when the size of the projections is larger than an optimum size, the sealing property may be lowered because the sealing surfaces of flanges are damaged by the projections, whereas when the size of the projections is smaller than the optimum size, a surface pressure necessary to sealing cannot be maintained because the gasket comes into contact with the sealing surfaces of flanges through the entire surfaces thereof. In addition to the above, it is very difficult in manufacturing to manage the shape of the small projections.

SUMMARY OF THE INVENTION

Accordingly, a main object of the present invention, which was made to overcome the drawbacks of the conventional metal gaskets, is to provide a gasket that has a small tightening force necessary to sealing, maintains ultra-high vacuum of $1 \times 10^{-11}$ Pa·m$^3$/secHe, and can make sealing even if it is repeatedly replaced on the same flange.

To achieve the above object, the gist of a metal gasket of a first aspect of the present invention resides in an annular metal gasket having a cross section provided with an outer circumferential opening and formed in one of a laterally U-shape and a C-shape, the metal gasket including annular voids formed to the innermost circumferential portions on the two confronting flat sealing surfaces of the metal gasket that are in contact with opponent or opposing surfaces, each void having a width equal to or more than 40% of the central wall thickness $t_0$ of the gasket and a height equal to or more than 5% of the height H of the gasket, and the cross section of the gasket being formed in a tuning-fork shape.

Further, the gist of a metal gasket according to a second aspect of the present invention resides in that the wall thickness $t_1$ of the portions of the metal gasket that are caused to come into contact with the opponents surfaces by tightening is gradually reduced to 50% of the wall thickness $t_1$ toward the circumferentially outermost portions of the metal gasket.

A metal material such as stainless steel, inconel, and the like and materials obtained by plating or vapor depositing soft metal such nickel and the like on the surfaces of the above metal materials can be generally used as a metal material used in the metal gasket of the present invention. However, when the metal gasket is used in a semiconductor industry, it is preferable to use a single material of corrosion resistant austenite stainless steel such as SUS 316L and a twice- or thrice-vacuum-melted material made of stainless steel (material that is melted and refined in vacuum twice or thrice to remove chemical components by which pollution is caused).

Further, as a machining method of the metal gasket of the present invention, a round metal bar or a metal tube is cut and formed in a lateral U-shape or a C-shape whose cross section has an outer circumferential opening, and then a stepped portion is formed. The stepped portion can be formed by a well-known machining method of removing a material by cutting such as turning, milling, grinding, knurling, and the like or by a method of die forging and the like which does not cut off the material.

DESCRIPTION OF THE PREFERRED EMBODIMENTS

Figure 1:
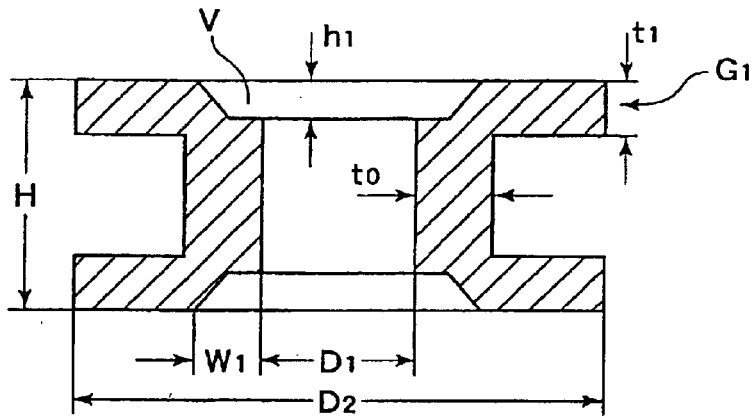
FIG. 1 is a longitudinal sectional view of a metal gasket showing an embodiment of the present invention.

As an embodiment of the present invention, in an annular-shaped $G_1$, which is made by cutting and has a C-shaped cross section having two legs interconnected by a bight section and having an outer circumferential opening between the legs, an inside diameter is set to $D_1$, an outside diameter is set to $D_2$, a height is set to H, a central wall thickness $t_0$ is set to 0.4 to 0.6 mm, the wall thickness $t_1$ of the portions in contact with opponent surfaces is set to 0.3 to 0.5 mm, annular-shaped voids V each having a trapezoidal cross section are formed in the innermost circumferential portions of the gasket, the width $w_1$ of the bottom of each void V on the side thereof where it comes into contact with an opponent surface is set to 0.2 to 0.7 mm, and the height $h_1$ of each void V is set to 0.1 to 0.30 mm as shown in FIG. 1. Further, the wall thickness of the portions of the gasket in contact with the opponent surfaces may be gradually reduced to 50% toward the outermost circumferential portions thereof.

Figure 5:
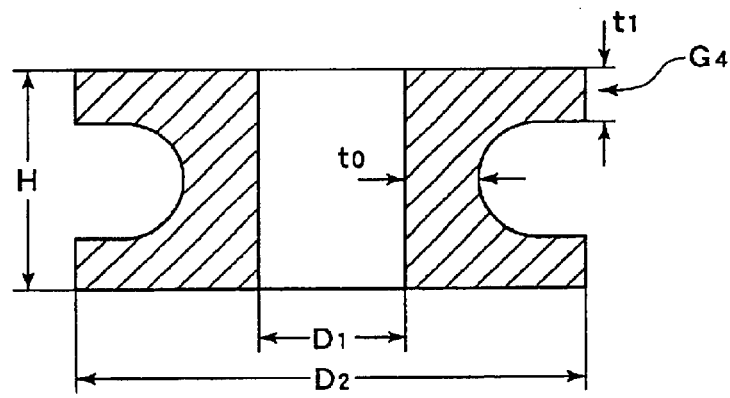
FIG. 5 is a longitudinal sectional view of a conventional metal gasket.
Figure 6:
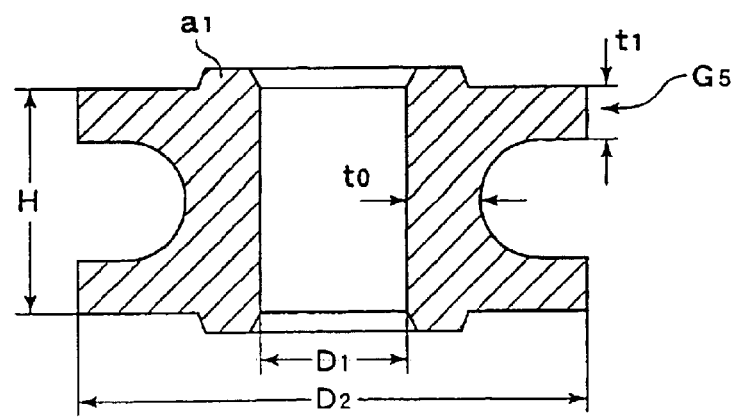
FIG. 6 is a longitudinal sectional view of a conventional metal gasket.

An FEM analysis in tightening was executed as to a conventional metal C-ring gasket $G_4$ as shown in FIG. 5, which had the same inside and outside diameters $D_1$ and $D_2$ as those shown in FIG. 1 and had no projection, and a conventional metal gasket $G_5$ as shown in FIG. 6, which had the same inside and outside diameters $D_1$ and $D_2$ and the same height H as those shown in FIG. 1 and had projections $a_1$ having a trapezoidal cross section, and the distributions of surface pressures and the compression curves of these gaskets were determined.

Figure 7:
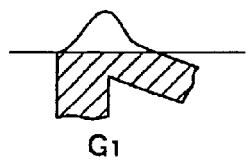
FIG. 7 is view showing the distribution of surface pressure of a metal gasket showing an embodiment of the present invention when the gasket is tightened.
Figure 8:
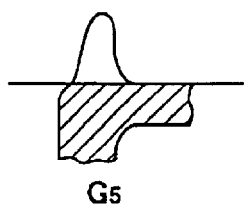
FIG. 8 is a view showing the distribution of surface pressure of a conventional metal gasket when the gasket is tightened.
Figure 9:
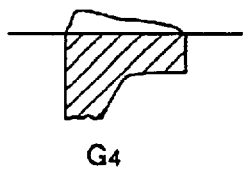
FIG. 9 is a view showing the distribution of surface pressure of a conventional metal gasket when the gasket is tightened.
Figure 10:
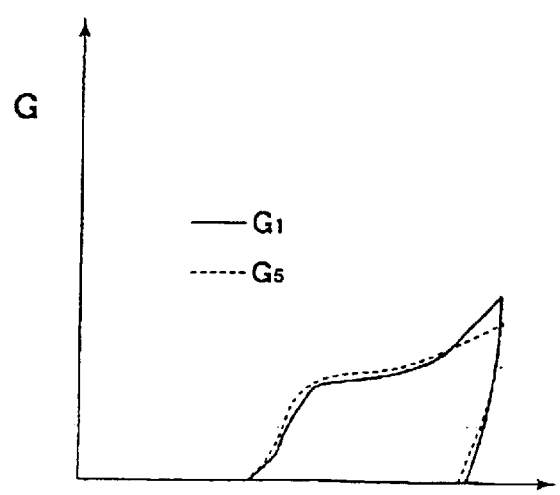
FIG. 10 is a graph showing compression curves of a metal gasket of the present invention and conventional metal gaskets.
Figure 11:
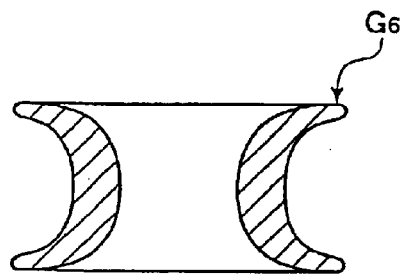
FIG. 11 is a longitudinal sectional view of a conventional metal gasket.
Figure 12:
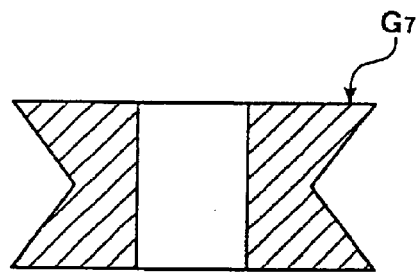
FIG. 12 is a longitudinal sectional view of a conventional metal gasket.
Figure 13:
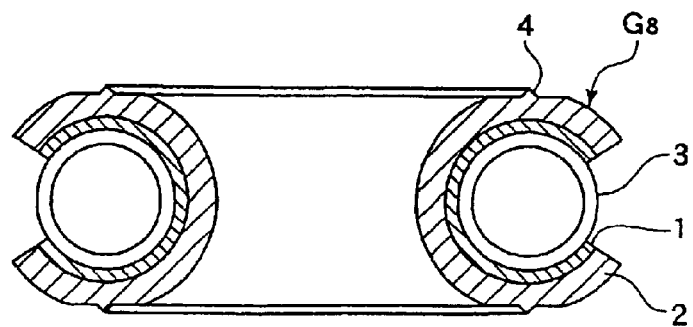
FIG. 13 is a longitudinal sectional view of a conventional metal gasket.

FIGS. 7 to 9 show the distributions of surface pressures of the gaskets, which are formed in the shapes shown in FIGS. 1, 5, and 6, in the vicinities of the portions thereof in contact with flanges, respectively, and FIG. 10 shows the compression restoration curves of these gaskets with respect to a compressive load G. In FIGS. 7 to 9, slanted portions show the cross sectional shapes of the gaskets when they are tightened, and curved portions show the distributions of surface pressures in the states that the gaskets are tightened. The metal C-ring gasket $G_4$ comes into contact with a flange through the entire surface thereof in the state that it is completely tightened, thereby the maximum surface pressure of the contact portion is reduced. In contrast, it can be expected that the metal C-ring gasket $G_1$ having the tuning-fork-shaped cross section can be tightened with a small tightening force because the gasket $G_1$ has small contact areas similarly to the metal C-ring gasket $G_5$ with the projections and the contact portions thereof have a high surface pressure to thereby maintain an excellent sealing property and further the gasket has a small compressive load when it is tightened.

In the tuning-folk shape, it is contemplated that the high surface pressure can be maintained without an extreme increase in the compressive load in tightening because the volume of the gasket $G_1$ in the vicinities of the contact portions thereof gradually moves toward inner circumferential spaces when the gasket $G_1$ is deformed.

Further, in the gasket $G_5$ with the projections, there is a possibility that flange surfaces are damaged because the area of the contact portions of the gasket $G_5$ is extremely small at the beginning of compression and a surface pressure becomes very high. In the tuning-folk shape, however, there is not a possibility that flanges are damaged because contact areas are larger than those of the gasket with the projections at the beginning of compression.

Further, as to a manufacturability, although it is difficult to stably machine the shape of the projections of the gasket $G_5$ with the projections, in the tuning-folk shape, machining and characteristics can be easily managed because it is required only to cut an inner circumference.

In the tuning-folk shape, the area of the contact portions can be reduced and the surface pressure can be increased by gradually reducing the wall thickness of the portions in contact with opponent surfaces in an outer circumferential direction. When, however, the wall thickness is reduced to 50% or more of the wall thickness $t_1$ of the portions in contact with the opponent surfaces, the distribution of surface pressure changes excessively large with respect to the change of dimension of the contact portions at the beginning of contact, which makes it difficult to maintain a stable sealing property.

Embodiments

Although embodiments of the present invention will be specifically explained below, the present invention is by no means limited to the embodiments.

Embodiment 1

In an embodiment 1, a round metal bar made of SUS 316L and having an outside diameter of 8.0 mm was cut to a length of 1.7 mm, and a metal gasket $G_1$ as shown in FIG. 1 was obtained by cutting the metal bar. The gasket was formed to have a C-shaped cross section and had an outside diameter $D_2$ of 7.2 mm, an inside diameter $D_1$ of 4.6 mm, a height H of 1.60 mm, a the bight section having a central wall thickness $t_0$ of 0.56 mm, and a wall thickness $t_1$ of 0.33 mm in the portions thereof in contact with opponent surfaces. Further, the gasket had voids V each having a trapezoidal cross section and formed to the innermost circumferential portions of the two sealing surfaces thereof in contact with flanges. Each void V had a width $w_1$ of 0.33 mm, a height $h_1$ of 0.11 mm and an area S of 0.03 mm². Thereafter, the metal gasket $G_1$ was subjected to annealing and electrolytic polishing, thereby the gasket having surface hardness of 200 Hv was obtained.

Embodiment 2

Figure 2:
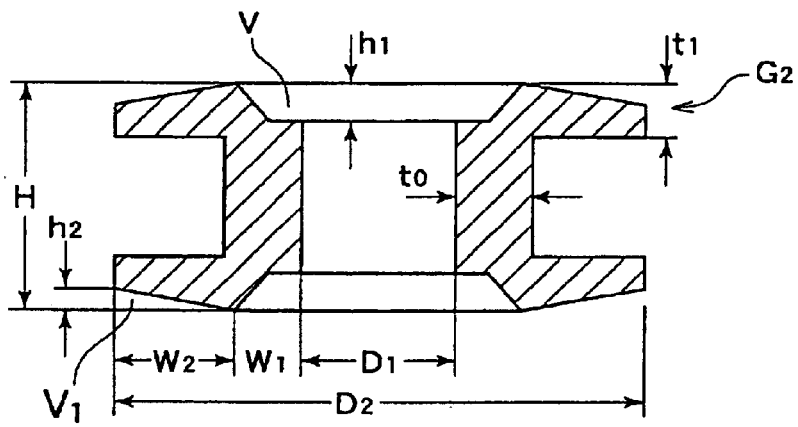
FIG. 2 is a longitudinal sectional view of a metal gasket showing another embodiment of the present invention.

In an embodiment 2 which was made by the same method as that of the embodiment 1, a round metal bar having an outside diameter of 8.0 mm was cut to a length of 1.7 mm, and a metal gasket $G_2$ as shown in FIG. 2 was obtained by cutting the metal bar. The gasket was formed to have a U-shaped cross section and had an outside diameter $D_2$ of 7.2 mm, an inside diameter $D_1$ of 4.6 mm, a height H of 1.60 mm, the bight section having a central wall thickness $t_0$ of 0.56 mm, and a wall thickness $t_1$ of 0.33 mm in the portions thereof in contact with opponent surfaces. Further, the gasket $G_2$ had voids V each having a trapezoidal cross section and formed to the innermost circumferential portions of the two sealing surfaces thereof in contact with flanges. Each void V had a width $w_1$ of 0.33 mm, a height $h_1$ of 0.11 mm and an area S of 0.03 mm². Furthermore, the gasket $G_2$ had voids $V_1$ each having a triangular cross section and formed toward the outer circumferences of the two sealing surfaces in contact with the flanges. Each void $V_1$ had a width $w_2$ of 0.90 mm, a height $h_2$ of 0.12 mm, and an area S of 0.05 mm². Thereafter, the metal gasket $G_2$ was subjected to annealing and electrolytic polishing, thereby the gasket having surface hardness of 200 Hv was obtained.

Embodiment 3

Figure 3:
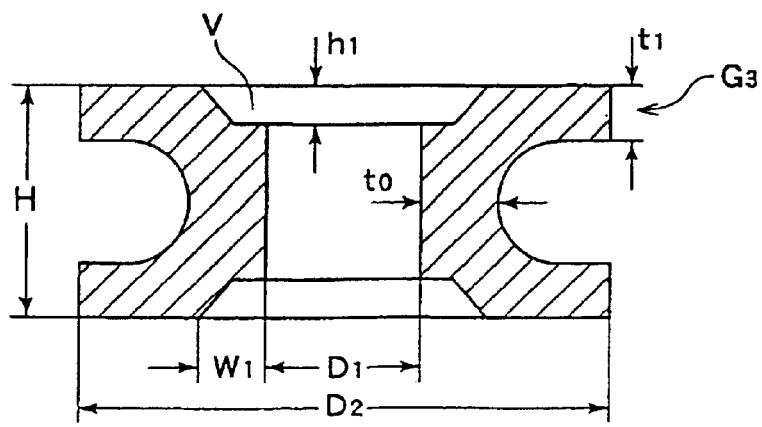
FIG. 3 is a longitudinal sectional view of a metal gasket showing still another embodiment of the present invention.

In an embodiment 3 which was made by the same method as that of the embodiment 1, a round metal bar having an outside diameter of 8.0 mm was cut to a length of 1.7 mm, and a metal gasket $G_3$ as shown in FIG. 3 was obtained by cutting the metal bar. The gasket was formed to have a U-shaped cross section and had an outside diameter $D_2$ of 7.2 mm, an inside diameter $D_1$ of 4.6 mm, a height H of 1.60 mm, the bight section having a central wall thickness to of 0.56 mm, and a wall thickness $t_1$ of 0.33 mm in the portions thereof in contact with opponent surfaces. The gasket $G_3$ had voids V each having a trapezoidal cross section and formed to the innermost circumferential portions of the two sealing surfaces thereof in contact with flanges. Each void V had a width $w_1$ of 0.33 mm, a height $h_1$ of 0.11 mm and an area S of 0.03 mm². Thereafter, the metal gasket $G_3$ was subjected to annealing and electrolytic polishing, thereby the gasket having surface hardness of 200 Hv was obtained.

Embodiment 4

Figure 4:
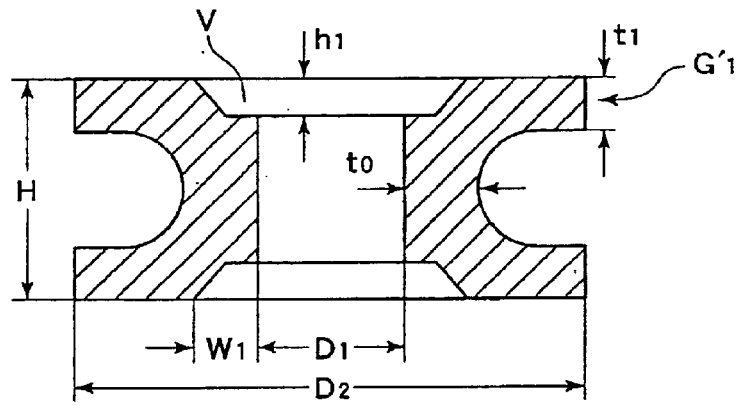
FIG. 4 is a longitudinal sectional view of a metal gasket showing a further embodiment of the present invention.

In an embodiment 4 which was made by the same method as that of the embodiment 1, a round metal bar having an outside diameter of 8.0 mm was cut to a length of 1.7 mm, and a metal gasket $G'_1$ as shown in FIG. 4 was obtained by cutting the metal bar. The gasket was formed to have a laterally U-shaped cross section and had an outside diameter $D_2$ of 7.2 mm, an inside diameter $D_1$ of 4.6 mm, a height H of 1.60 mm, the bight section having a central wall thickness $t_0$ of 0.56 mm, and a wall thickness $t_1$ of 0.33 mm in the portions thereof in contact with opponent surfaces. The gasket $G_2$ had voids V each having a trapezoidal cross section and formed to the innermost circumferential portions of the two sealing surfaces thereof in contact with flanges. Each void V had a width $w_1$ of 0.33 mm, a height $h_1$ of 0.11 mm and an area S of 0.03 mm². Thereafter, the metal gasket $G'_1$ was subjected to annealing and electrolytic polishing, thereby the gasket having surface hardness of 200 Hv was obtained.

Comparative Embodiment 1

In an comparative embodiment 1 which was made by the same method as that of the embodiment 1, a round metal bar having an outside diameter of 8.0 mm was cut to a length of 1.9 mm, and a metal gasket $G_4$ as shown in FIG. 5 was obtained by cutting the metal bar. The gasket was formed to have a laterally U-shaped cross section and had an outside diameter $D_2$ of 7.2 mm, an inside diameter $D_1$ of 4.6 mm, a height H of 1.78 mm, the bight section having a central wall thickness $t_0$ of 0.56 mm, and a wall thickness $t_1$ of 0.46 mm in the portions thereof in contact with opponent surfaces. Thereafter, the metal gasket $G_4$ was subjected to annealing and electrolytic polishing, thereby the gasket having surface hardness of 200 Hv was obtained.

Comparative Embodiment 2

In an comparative embodiment 2 which was made by the same method as that of the embodiment 1, a round metal bar having an outside diameter of 8.0 mm was cut to a length of 1.7 mm, and a metal gasket $G_5$ as shown in FIG. 6 was obtained by making a gasket main body by cutting the metal bar. The gasket main body was formed to have a U-shaped cross section and had an outside diameter $D_2$ of 7.2 mm, an inside diameter $D_1$ of 4.6 mm, a height H of 1.60 mm, the bight section having a central wall thickness $t_0$ of 0.40 mm, and a wall thickness $t_1$ of 0.33 mm in the portions thereof in contact with opponent surfaces. Further, an annular-shaped projection $a_1$ having a trapezoidal cross section was formed on each of the surfaces of the gasket main body in contact with the opponent surfaces. The projection $a_1$ had a diameter of 5.0 mm in the central portion of the apex thereof, a width of 0.4 mm on the bottom thereof on a gasket main body side, a width of 0.1 mm on the side opposite to the gasket main body side, and a height h of 0.1 mm. Thereafter, the metal gasket $G_5$ was subjected to annealing and electrolytic polishing, thereby the gasket having surface hardness of 200 Hv was obtained.

A sealing test was executed using a helium leak detector to compare the sealing properties of the embodiments 1 to 4 and the comparative embodiments 1 and 2.

Figure 14:
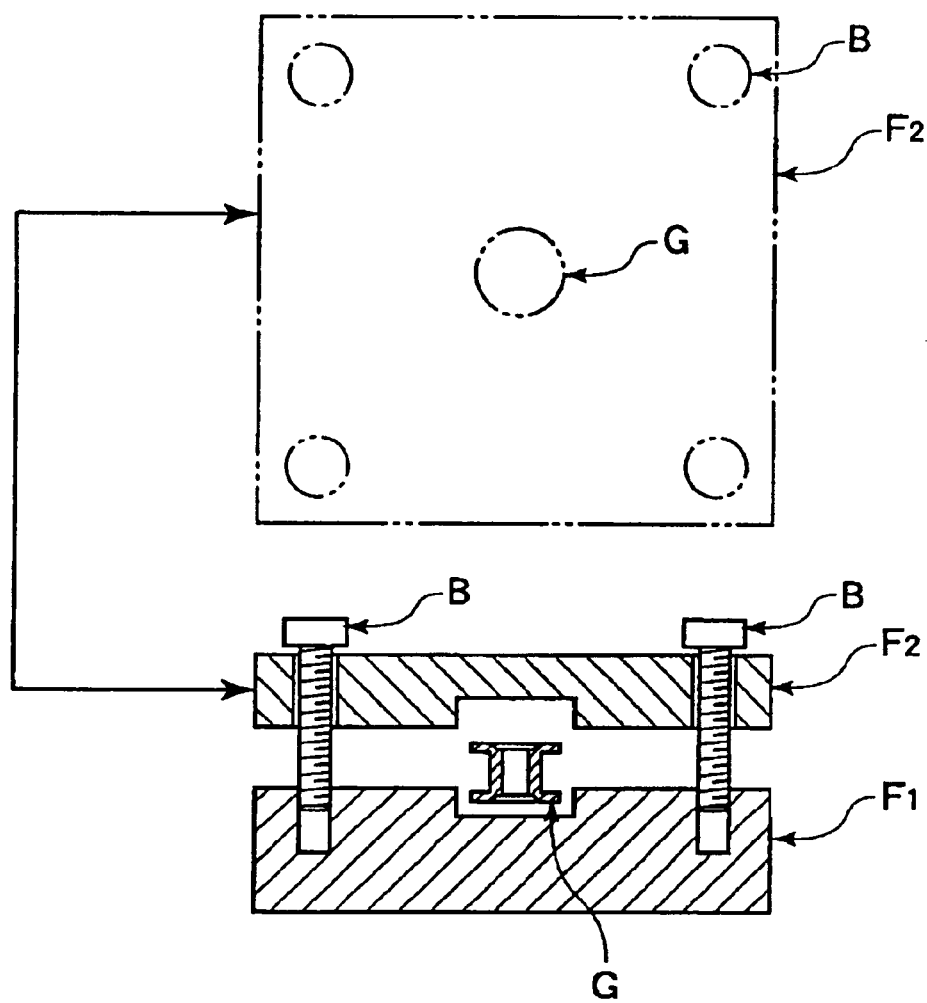
FIG. 14 is a schematic view of a seal test of a gasket.

In the test, a gasket G acting as a test piece was attached between square plate-shaped flanges $F_1$ and $F_2$ as shown in FIG. 14, and a helium leak test was executed while diagonally step-by-step tightening four bolts B inserted into the flanges at the corners thereof with tightening torque of 0.1 Nm/piece, and tightening torque (seal possible torque) which made a leak to $1 \times 10^{-11}$ Pa·m³/secHe or less was determined.

Next, a compression/restoration test was made to these gaskets, and loads (compressive loads) when gaskets were completely tightened were determined. Table 1 shows the result of the test. Note that the embodiment 4 was arranged approximately similarly to the embodiment 1 described above except that the outer circumferential groove was rounded and that the C-shaped cross section was changed to the laterally U-shaped cross section, and further the characteristics of the embodiment 4 are approximately the same as those of the embodiment 1, and thus the embodiment 4 is not explained in detail here. Further, it was confirmed that no leak was caused even if the metal gaskets of the embodiments and the comparative embodiments were replaced 20 times.

TABLE 1

| | Seal possible torque [Nm/piece] | Compressive load [kN] |
|---|---|---|
| Embodiment 1 | 2.2 | 4.0 |
| Embodiment 2 | 0.9 | 3.8 |
| Embodiment 3 | 1.5 | 2.9 |
| Comparative embodiment 1 | 4.6 | 7.2 |
| Comparative embodiment 2 | 0.8 | 3.5 |

As apparent from Table 1, it can be confirmed that although the seal possible torque of the embodiments of the present invention having the tuning-fork-shaped cross section is lower than that of the embodiment without the projection as well as has a smaller compressive load and is not inferior to the embodiment having the projection, the compressive load can be more reduced by providing the voids with the portions of the gaskets which are in contact with flange surfaces.

As explained above in detail, the metal gaskets according to the present invention can reduce a tightening force necessary to sealing by forming the cross sections of the gaskets in the tuning-fork shape and providing the voids with the surfaces thereof in contact with opponent surfaces. Further, since micromachining that is required to form a projection is not necessary, there can be obtained an effect of easily managing the manufacturability and the characteristics of the gaskets.

What is claimed is:

1. An annular-shaped gasket having one of a laterally opening U-shape and a C-shape formed by two legs separated by an outer circumferential opening and interconnecting bight section, comprising annular-shaped voids formed in the innermost circumferential portions on the two confronting flat sealing surfaces of the metal gasket that are in contact with opposing surfaces, each void having a width equal to or more than 40% of a central wall thickness $t_0$ of the bight section and a height equal to or more than 5% of the height H of the gasket, wherein the cross section of the gasket is formed in a tuning-fork shape.

2. A metal gasket according to claim 1, wherein a wall thickness $t_1$ of the legs of the metal gasket that are caused to come into contact with the opposing surfaces are gradually reduced to 50% of the wall thickness $t_1$ toward the circumferentially outermost portions of the legs of the metal gasket.

* * * * *